US011927318B2

(12) United States Patent
Zhu et al.

(10) Patent No.: US 11,927,318 B2
(45) Date of Patent: *Mar. 12, 2024

(54) HEADLAMP OPTICAL ELEMENT WITH III-REGION LIGHT SHAPE FORMING STRUCTURE

(71) Applicant: HASCO VISION TECHNOLOGY CO., LTD., Shanghai (CN)

(72) Inventors: He Zhu, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/791,950

(22) PCT Filed: Jan. 13, 2021

(86) PCT No.: PCT/CN2021/071508

§ 371 (c)(1),
(2) Date: Jul. 11, 2022

(87) PCT Pub. No.: WO2021/147731

PCT Pub. Date: Jul. 29, 2021

(65) Prior Publication Data

US 2023/0043186 A1 Feb. 9, 2023

(30) Foreign Application Priority Data

Jan. 20, 2020 (CN) ......................... 202010067744.0

(51) Int. Cl.
*F21S 41/20* (2018.01)
*F21S 41/37* (2018.01)
*F21W 102/13* (2018.01)

(52) U.S. Cl.
CPC ............... *F21S 41/20* (2018.01); *F21S 41/37* (2018.01); *F21W 2102/13* (2018.01)

(58) Field of Classification Search
CPC ...... F21S 41/143; F21S 41/147; F21S 41/151; F21S 41/20; F21S 41/24; F21S 41/255;
(Continued)

(56) References Cited

U.S. PATENT DOCUMENTS 11,731,552 B2 * 8/2023 Zhu ........................... F21V 1/16 315/82
11,745,639 B2 * 9/2023 Zhu ....................... F21S 41/143 315/82

(Continued)

FOREIGN PATENT DOCUMENTS

CN 102628574 A 8/2012
CN 104121535 A 10/2014

(Continued)

OTHER PUBLICATIONS

DE 102019118968.3, Dressler et al., foreign priority document of US PGPub 2022/0136673 A1, filed Jul. 12, 2019. (Year: 2019).*

(Continued)

*Primary Examiner* — Alicia M Harrington
*Assistant Examiner* — Steven Y Horikoshi
(74) *Attorney, Agent, or Firm* — Volpe Koenig

(57) ABSTRACT

A headlamp optical element with a III-region light shape forming structure that comprises a light collecting portion, a first light emitting portion, a reflecting portion, and optionally a second light emitting portion. The light collecting portion converges incident light and emits light via the first light emitting portion. Some light may be directly emitted to the second light emitting portion. The rest of the light may be reflected by the reflecting portion and emitted to the second light emitting portion. The reflecting portion is
(Continued)

connected to the lower portion of the first light emitting portion, with a lower beam cut-off line structure at the other end thereof. The light emitting surface of the first light emitting portion comprises multiple step surfaces with segment differences or is a single curved surface.

22 Claims, 12 Drawing Sheets

(58) Field of Classification Search
CPC ........ F21S 41/285; F21S 41/322; F21S 41/37; F21W 2102/13; F21W 2102/135
See application file for complete search history.

(56) References Cited

U.S. PATENT DOCUMENTS

| | | | | |
|---|---|---|---|---|
| 2009/0103323 | A1 | 4/2009 | Ishida | |
| 2010/0309679 | A1 * | 12/2010 | Yamagata | F21S 41/148 362/547 |
| 2013/0235608 | A1 * | 9/2013 | Tsai | F21S 41/265 362/551 |
| 2019/0017670 | A1 * | 1/2019 | Zhu | F21S 41/24 |
| 2022/0034470 | A1 * | 2/2022 | Chen | F21S 41/27 |
| 2022/0136673 | A1 * | 5/2022 | Dressler | F21S 41/151 362/516 |

FOREIGN PATENT DOCUMENTS

| | | | | | |
|---|---|---|---|---|---|
| CN | 105745488 | A | | 7/2016 | |
| CN | 106439672 | A | * | 2/2017 | F21S 41/255 |
| CN | 106439672 | A | | 2/2017 | |
| CN | 106471309 | A | | 3/2017 | |
| CN | 1108302471 | A | | 7/2018 | |
| CN | 108758547 | A | * | 11/2018 | F21S 41/141 |
| CN | 108800044 | A | | 11/2018 | |
| CN | 108980774 | A | | 12/2018 | |
| CN | 109027955 | A | | 12/2018 | |
| CN | 109140377 | A | | 1/2019 | |
| CN | 110220158 | A | | 9/2019 | |
| CN | 110440217 | A | | 11/2019 | |
| CN | 209801360 | U | | 12/2019 | |
| CN | 211694701 | U | | 10/2020 | |
| CN | 211694711 | U | | 10/2020 | |
| CN | 211694714 | U | | 10/2020 | |
| CN | 211694718 | U | | 10/2020 | |
| GB | 4599-2007 | | | 11/2007 | |
| JP | 2012256491 | A | | 12/2012 | |

OTHER PUBLICATIONS

Machine translation of DE 102019118968.3, retrieved from Google on Jul. 25, 2023 (Year: 2023).*
Machine translation of CN 108758547A, retrieved from worldwide.espacenet.com on Jul. 26, 2023 (Year: 2023).*
Machine translation of CN 106439672A, retrieved from worldwide.espacenet.com on Jul. 25, 2023 (Year: 2023).*

* cited by examiner

HEADLAMP OPTICAL ELEMENT WITH III-REGION LIGHT SHAPE FORMING STRUCTURE

CROSS-REFERENCE TO RELATED APPLICATIONS

This application is a 35 U.S.C. § 371 national stage of PCT/CN2021/071508, which is titled "HEADLAMP OPTICAL ELEMENT, VEHICLE LAMP MODULE, VEHICLE LAMP, AND VEHICLE" and claims the benefit of Chinese Patent Application No. 202010067744.0 filed on Jan. 20, 2020, both of which are incorporated herein by reference as if fully set forth.

FIELD OF THE INVENTION

The disclosure relates to a vehicle lamp, in particular to a headlamp optical element. In addition, the disclosure further relates to a vehicle lamp module, a vehicle lamp and a vehicle.

BACKGROUND OF THE INVENTION

In recent years, a vehicle lamp and a headlamp module assembled in the vehicle lamp are rapidly developing from an earlier halogen lamp to a later xenon lamp and then to an existing LED or laser light source, so that the vehicle lamp becomes more intelligent, and the shape is more differentiated. Among various vehicle lamp light sources, the LED light source is gradually gaining the attention of automobile manufacturers due to the advantages of excellent performance and low cost, and along with the development of the LED light source, the light distribution structure of the LED light source is also gradually developing.

In the prior art, a projection type lighting system of an LED light source commonly used in a vehicle lamp generally includes a light source, a reflecting element or a light converging element, a shading plate and an optical lens. Light emitted by the light source is reflected by the reflecting element and then emitted to the shading plate, and after being intercepted by the shading plate, the light is projected by the optical lens to form an illumination light shape with a bright-dark cut-off line, or the light emitted by the light source is converged by the light converging element and is intercepted by the upper surface or the lower surface of the light converging element and then is projected by the optical lens to form the illumination light shape with the bright-dark cut-off line. However, due to the fact that the light emitting angle of the LED light source is large, the size of the reflecting element needs to have a large coverage range relative to the light emitting angle of the light source, the light converging element needs a long light channel to guarantee a certain system lighting effect, the light channel is of a solid light guide body structure, however, due to the fact that the light converging element is too long, the size of the vehicle lamp module is large, and the structure is not compact enough, and the overlong light converging element uses more materials, so that the manufacturing cost is higher. Along with the large-size reflecting mirror or the overlong light converging element, optical elements such as the shading plate, the lens and the like which are matched with the reflecting mirror or the overlong light converging element for use are correspondingly increased, so that the manufacturing cost is further increased, and there is a prominent contradiction with the trend of more compact automobile shape in the future. Therefore, a compact, light and efficient optical system is needed to meet the strong market requirements.

In view of the defects in the prior art, a headlamp optical element needs to be designed.

SUMMARY OF THE INVENTION

The problem to be solved in the first aspect of the disclosure is to provide a headlamp optical element, which is compact in structure, small in volume and high in optical efficiency.

In addition, the problem to be solved in the second aspect of the disclosure is to provide a vehicle lamp module, which is compact in structure, small in volume and high in optical efficiency.

Furthermore, the problem to be solved in the third aspect of the disclosure is to provide a vehicle lamp, which is compact in structure, small in volume and high in optical efficiency.

Furthermore, the problem to be solved in the fourth aspect of the disclosure is to provide a vehicle, which is compact in structure, small in volume and high in optical efficiency.

In order to solve the above technical problems, on one hand, the disclosure provides the headlamp optical element, and the headlamp optical element includes a light collecting portion, a first light emitting portion and a reflecting portion which are sequentially and integrally connected along the light emitting direction; or the headlamp optical element includes the light collecting portion, the first light emitting portion, the reflecting portion and a second light emitting portion which are sequentially and integrally connected along the light emitting direction, the first light emitting portion, the reflecting portion and the second light emitting portion define a first cavity, and the light collecting portion is able to converge incident light and emit the light via the first light emitting portion, with some of the light being able to be directly emitted to the second light emitting portion after passing through the first cavity, and the rest of the light being able to be reflected by the reflecting portion and then emitted to the second light emitting portion; one end of the reflecting portion is connected with the lower portion of the first light emitting portion, and the other end of the reflecting portion is provided with a lower beam cut-off line structure used for forming a lower beam bright-dark cut-off line; or one end of the reflecting portion is connected with the upper portion of the first light emitting portion, and the other end of the reflecting portion is provided with a high beam cut-off line structure used for forming a high beam bright-dark cut-off line; and a light-emitting surface of the first light-emitting portion is formed of multiple step surfaces with segment differences or is a single smooth curved surface with continuous curvature.

As a preferable structural form, the light collecting portions are of a light converging cup structure and are arranged in one-to-one correspondence with the step surfaces.

More preferably, the step surface is a plane or a smooth curved surface with continuous curvature.

As another preferable structural form, the area of the step surface in the middle region is larger than those of the step surfaces on the two sides.

As another preferable structural form, a light-emitting surface of the second light-emitting portion is a smooth concave curved surface with continuous curvature.

As a specific implementation mode, an end surface of one end, far away from the light collecting portion, of the reflecting portion is a smooth concave arc-shaped curved surface with continuous curvature.

As another specific implementation mode, the headlamp optical element further includes side walls, the side walls are arranged on the left side and the right side of the reflecting portion, one end of each side wall is connected with the first light emitting portion, and the other end of each side wall is connected with the second light emitting portion.

More specifically, a 50 L dark region forming structure is formed on a reflecting surface of the reflecting portion with the lower beam cut-off line structure, and the brightness of a lower beam 50 L region is able be reduced after light is reflected and refracted by the 50 L dark region forming structure.

As another specific implementation mode, the lower beam cut-off line structure is arranged on the front edge of the reflecting surface of the reflecting portion, the lower portion of the light collecting portion is provided with a III-region light shape forming structure, and the III-region light shape forming structure is able to form a lower beam III-region light shape.

More specifically, the number of the light collecting portions is two or above.

Further specifically, a reflection increasing layer is arranged on the reflecting surface of the reflecting portion.

The second aspect of the disclosure further provides a vehicle lamp module which includes the headlamp optical element according to any one of the above technical solutions and a lens, the lens is arranged along the light emitting direction of the headlamp optical element, and the headlamp optical element is directly connected with the lens; or the vehicle lamp module further includes a connecting plate, the headlamp optical element and the lens are connected through the connecting plate, and the headlamp optical element, the lens and the connecting plate are integrally formed in an injection molding mode.

As a unique preferable structural form, the lower beam cut-off line structure or the high beam cut-off line structure is located in a region 10 mm above an optical axis of the lens and 10 mm below the optical axis of the lens.

More specifically, the lens is of a convex lens or a Fresnel lens structure.

The third aspect of the disclosure further provides a vehicle lamp which includes the vehicle lamp module according to any one of the above technical solutions.

The fourth aspect of the disclosure further provides a vehicle which includes the vehicle lamp in the above technical solutions.

According to the above technical solutions, the headlamp optical element includes the light collecting portion, the first light emitting portion and the reflecting portion which are sequentially and integrally connected along the light emitting direction; or the headlamp optical element includes the light collecting portion, the first light emitting portion, the reflecting portion and the second light emitting portion which are sequentially and integrally connected along the light emitting direction, the first light emitting portion, the reflecting portion and the second light emitting portion define a first cavity, and the light collecting portion is able to converge incident light and emit the light via the first light emitting portion, with some of the light being able to be directly emitted to the second light emitting portion after passing through the first cavity, and the rest of the light being able to be reflected by the reflecting portion and then emitted to the second light emitting portion; one end of the reflecting portion is connected with the lower portion of the first light emitting portion, and the other end of the reflecting portion is provided with a lower beam cut-off line structure used for forming a lower beam bright-dark cut-off line; or one end of the reflecting portion is connected with the upper portion of the first light emitting portion, and the other end of the reflecting portion is provided with a high beam cut-off line structure used for forming a high beam bright-dark cut-off line; and a light-emitting surface of the first light-emitting portion is formed of multiple step surfaces with segment differences or is a single smooth curved surface with continuous curvature. The occupied space of the headlamp optical element is small, the space utilization rate is greatly improved, the requirements of the market for diversification and miniaturization of the vehicle lamp can be met, and the structure of the vehicle lamp is simplified on the basis of improving the position precision between optical surfaces on a light propagation path, so that the vehicle lamp is lighter.

Other advantages of the disclosure and the technical effects of the preferable implementation modes are further described in the following specific implementation modes.

Brief Description of the Symbols:

| | |
|---|---|
| 1. Headlamp optical element | 11. Light collecting portion |
| 12. First light emitting portion | 121. Step surface |
| 13. Reflecting portion | 14. Second light emitting portion |
| 15. Lower beam cut-offline structure | 16. First cavity |
| 17. High beam cut-offline structure | 18. Side wall |
| 19a. 50L dark region forming structure | 19b.III-region light shape forming structure |
| 2. Lens | 21. Optical axis |
| 3. Connecting plate | 5. Light source |
| 61. Lower beam bright-dark cut-offline | 62. High beam bright-dark cut-offline |
| 63. III-region | 64. 50L region |

DETAILED DESCRIPTION OF THE EMBODIMENTS

The specific implementation modes of the disclosure are described in detail according to the following drawings. It should be understood that the specific implementation modes described herein are only used to illustrate and interpret the present disclosure, but not to limit the present disclosure.

Figure 1:
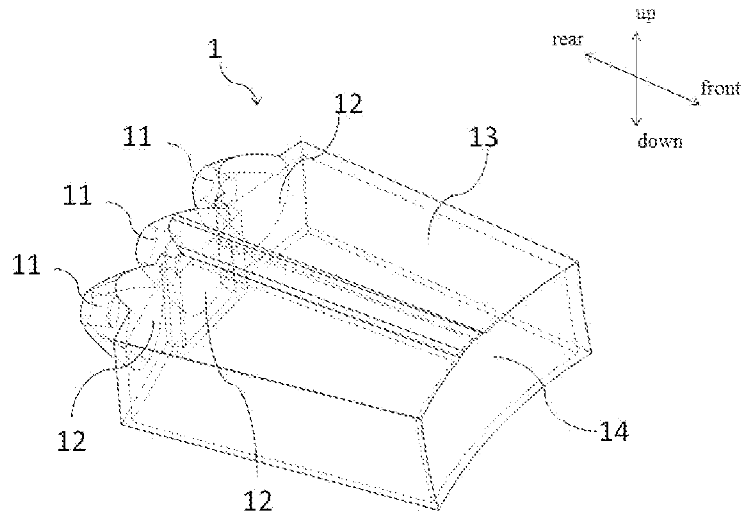
FIG. 1 is a first three-dimensional structure diagram of a first specific embodiment of the headlamp optical element.

Firstly, it needs to be explained that as shown in FIG. 1, when the headlamp optical element is normally installed in the vehicle lamp, along the light emitting direction, the "front" refers to the end where the second light emitting portion 14 is located, the "rear" refers to the end where the light collecting portion 11 is located, and the "left and right" refers to the left side and the right side of the headlamp optical element along the light emitting direction; the "up and down" means above and below the headlamp optical element along the light emitting direction.

Meanwhile, as shown in FIG. 6, FIG. 7, FIG. 11, FIG. 24, FIG. 26 and FIG. 37, the optical axis 21 is a virtual straight line which extends along the front-rear direction of the headlamp optical element and passes through the focal point of the lens 2.

In addition, according to the definition of GB 4599-2007—Motor vehicle headlamps equipped with filament lamps, a bright-dark cut-off line is a boundary line of obvious bright-dark change sensed by visual sense when a light beam is projected to a light distribution screen. The lower beam bright-dark cut-off line 61 refers to the upper boundary of the lower beam light shape of the vehicle lamp, and the high beam bright-dark cut-off line 62 refers to the lower boundary of the high beam light shape of the vehicle lamp. In the actual installation condition, the orientation terms shall be explained according to the actual installation state and in combination with the headlamp optical element 1 itself of the disclosure. The terms are based on the orientation or position relationship shown in the attached drawings, which are only for the convenience of describing the disclosure and simplifying the description, rather than indicating or implying that the device or element must have a specific orientation, be constructed and operated in a specific orientation, Therefore, they cannot be understood as a limitation of the present disclosure.

In the description of the disclosure, it should be noted that the term "installation" and "connection" should be subjected to generalized understanding unless specific regulations and limits are provided, for example, the term "connection" can be fixed connection, detachable connection or integrated connection; the two elements can be directly connected or indirectly connected through an intermediate medium, and the two elements can be internally communicated or interacted with each other. For those of ordinary skill in the field, the specific meanings of the terms in the disclosure can be understood according to specific conditions.

As shown in FIG. 27 to FIG. 32, FIG. 34 and FIG. 35, the disclosure provides the headlamp optical element, and the headlamp optical element includes a light collecting portion 11, a first light emitting portion 12 and a reflecting portion 13 which are sequentially and integrally connected along the light emitting direction.

Optionally, as shown in FIG. 1 to FIG. 4 and FIG. 16 to FIG. 18, the headlamp optical element includes the light collecting portions 11, the first light emitting portion 12, the reflecting portion 13 and the second light emitting portion 14 which are sequentially and integrally connected along the light emitting direction, and a first cavity 16 is defined by the first light emitting portion 12, the reflecting portion 13 and the second light emitting portion 14; the light collecting portion 11 is able to converge incident light and emit the light via the first light emitting portion 12, with some of the light being able to be directly emitted to the second light emitting portion 14 after passing through the first cavity 16, and the rest of the light being able to be reflected by the reflecting portion 13 and then emitted to the second light emitting portion 14.

As shown in FIG. 16 to FIG. 18, FIG. 27 to FIG. 30, FIG. 32, FIG. 34 and FIG. 35, one end of the reflecting portion 13 is connected with the lower portion of the first light emitting portion 12, and the other end of the reflecting portion 13 is provided with a lower beam cut-off line structure 15 used for forming a lower beam bright-dark cut-off line 61.

Optionally, as shown in FIG. 1 to FIG. 4 and FIG. 31, one end of the reflecting portion 13 is connected with the upper portion of the first light emitting portion 12, and the other end of the reflecting portion 13 is provided with a high beam cut-off line structure 17 used for forming a high beam bright-dark cut-off line 62; and the light-emitting surface of the first light-emitting portion 12 is formed of multiple step surfaces 121 with segment differences or is a single smooth curved surface with continuous curvature.

According to the description, the reflecting portion 13 is provided with a reflecting surface, namely the surface close to the first cavity 16 of the reflecting portion 13, and the reflecting surface of the reflecting portion 13 can reflect some of the light emitted by the first light emitting portion 12. The lower beam cut-offline structure 15 or the high beam cut-off line structure 17 is formed at the front end of the reflecting portion 13, and the shape of the lower beam cut-off line structure 15 or the high beam cut-off line structure 17 is made according to different laws and regulations or different requirements of different countries, areas and vehicle manufacturers and is not limited to the shape shown in the attached drawings. After the incident light is converged by the light collecting portion 11, the incident light is emitted through the first light emitting portion 12, and some of the incident light passes through the first cavity 16 and is directly emitted to the second light emitting portion 14 or an optical element arranged at the front end of the headlamp optical element 1, and the rest of the incident light is reflected by the reflecting portion 13 and then is emitted to the second light emitting portion 14 or an optical element arranged at the front end of the headlamp optical element 1. The divergent light can form a light beam with a small angle after being refracted or reflected by the light collecting portion 11, so that the light emitted by the light source 5 can completely or mostly enter the reflecting portion 13 and the second light emitting portion 14 or an optical element arranged at the front end of the headlamp optical element 1. The size of the headlamp optical element 1 can be reduced while the high lighting effect is achieved, so that the headlamp optical element 1 further tends to be miniaturized and lighter, the occupied space of the headlamp optical element 1 is small, and the space utilization efficiency is greatly improved; and the process requirement of integral forming can be met, so that the position precision between optical surfaces on a light propagation path is improved, and the structure is relatively simplified.

In the above structure, the occupied space of the headlamp optical element 1 is small, the space utilization efficiency is greatly improved, and the process requirement of integral forming can be met. The light collecting portions 11, the first light emitting portion 12, the reflecting portion 13 and the second light emitting portion 14 are integrally formed through injection molding, so that the position precision between the individual optical surfaces of the headlamp optical element 1 is improved, and the structure of the headlamp optical element 1 is relatively simplified; due to the arrangement of the first cavity 16, on one hand, materials can be saved, the cost is reduced, and the headlamp optical element 1 is lighter; and on the other hand, compared with a condensation element with a longer solid light guide body in the prior art, the headlamp optical element 1 is additionally provided with two light distribution optical surfaces, namely the light outlet surface of the first light-emitting portion 12 and the light inlet surface of the second light-emitting portion 14, so that the light distribution parameters are increased, and the light distribution is more flexible.

As a preferable implementation mode, the light collecting portions 11 are of a light converging cup structure and are arranged in one-to-one correspondence with the step surfaces 121. The light converging cup structure is a common light converging structure in the field of vehicle lamps. Specifically, as a structural form of the light converging cup, a concave cavity is formed in the end, away from the reflecting portion, of the light collecting portion, the concave cavity includes a front light inlet surface and a side light inlet surface, the front light inlet surface is a curved surface protruding towards the side away from the reflecting portion, and the side light inlet surface is a curved surface of which the perimeter is gradually reduced from one end far away from the reflecting portion to the other end close to the reflecting portion, and the outer contour surface of the light collecting portion is a curved surface of which the perimeter is gradually increased from one end far away from the reflecting portion to the other end close to the reflecting portion.

Preferably, the step surface 121 is a plane or a smooth curved surface with continuous curvature.

More preferably, the area of the step surface 121 in the middle region is larger than the areas of the step surfaces on the two sides.

Figure 2:
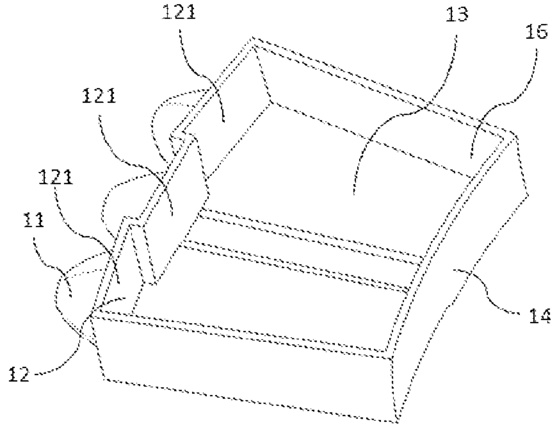
FIG. 2 is a second three-dimensional structure diagram of the first specific embodiment of the headlamp optical element.
Figure 3:
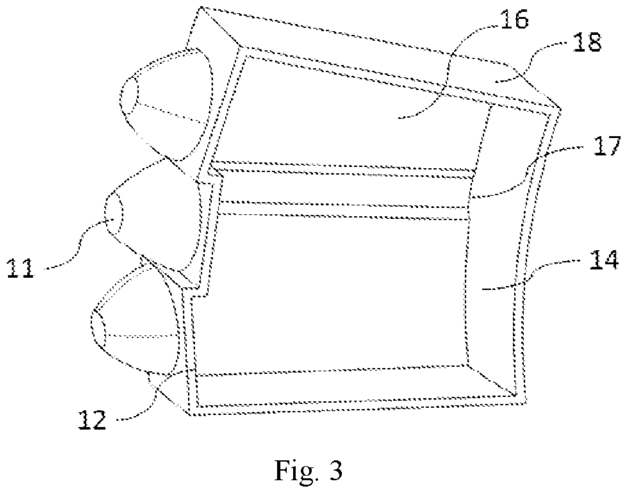
FIG. 3 is a third three-dimensional structure diagram of the first specific embodiment of the headlamp optical element.
Figure 4:
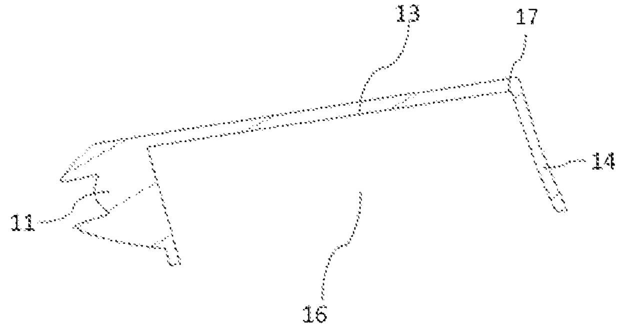
FIG. 4 is a section view of the first specific embodiment of the headlamp optical element.
Figure 5:
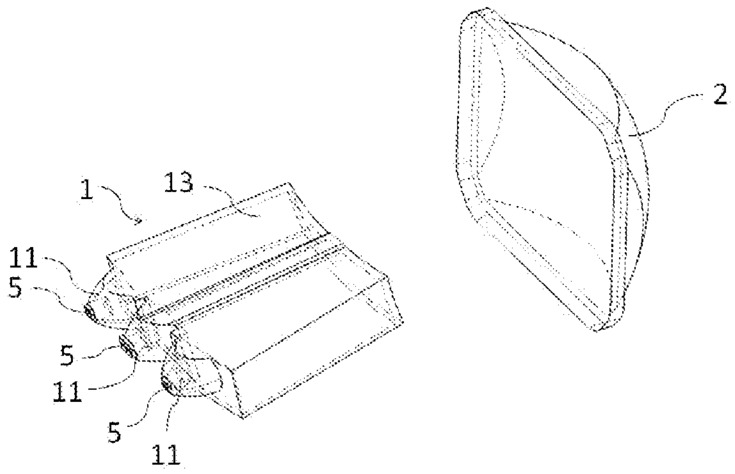
FIG. 5 is a three-dimensional structure diagram of a first specific embodiment of the vehicle lamp module including the headlamp optical element in FIG. 1.
Figure 6:
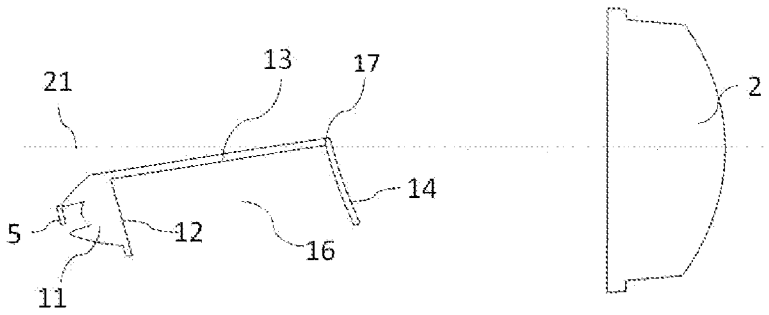
FIG. 6 is a section view of the vehicle lamp module in FIG. 5.
Figure 7:
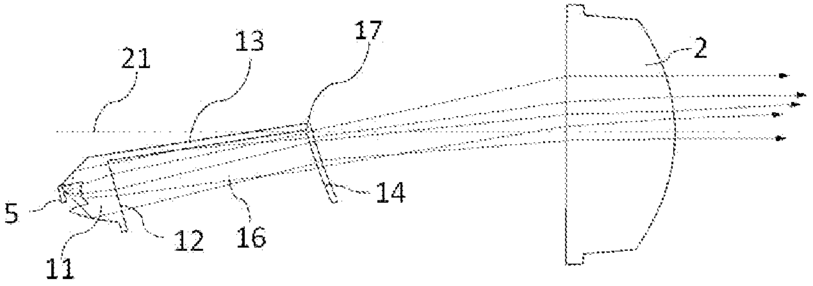
FIG. 7 is a light path schematic diagram of FIG. 5.
Figure 8:
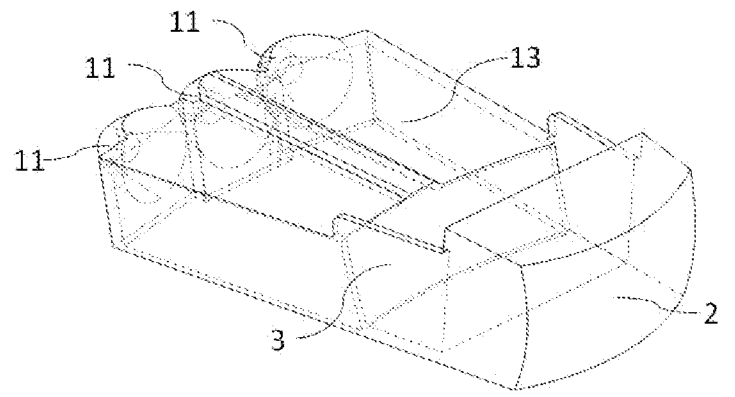
FIG. 8 is a first three-dimensional structure diagram of a second specific embodiment of the vehicle lamp module including the headlamp optical element in FIG. 1.
Figure 9:
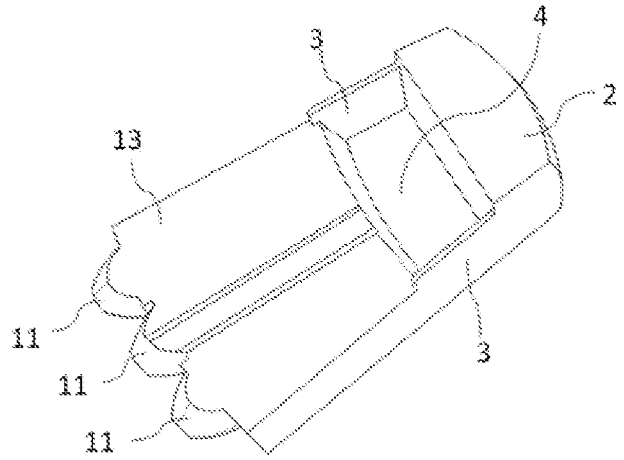
FIG. 9 is a second three-dimensional structure diagram of the second specific embodiment of the vehicle lamp module including the headlamp optical element in FIG. 1.
Figure 10:
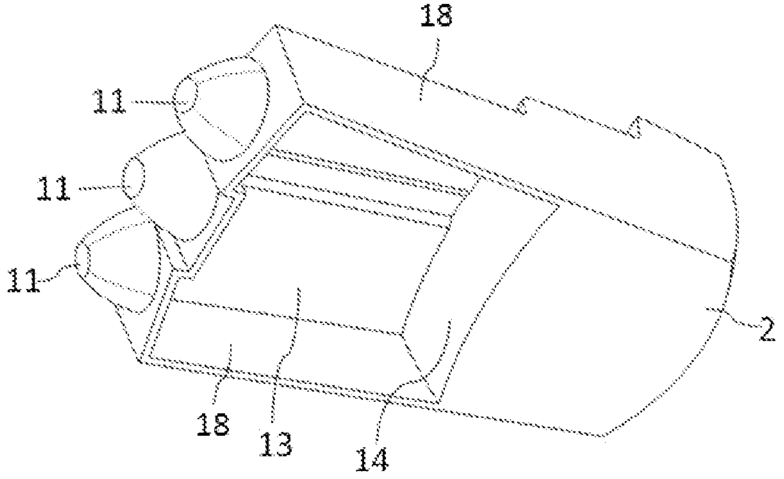
FIG. 10 is a third three-dimensional structure diagram of the second specific embodiment of the vehicle lamp module including the headlamp optical element in FIG. 1.
Figure 11:
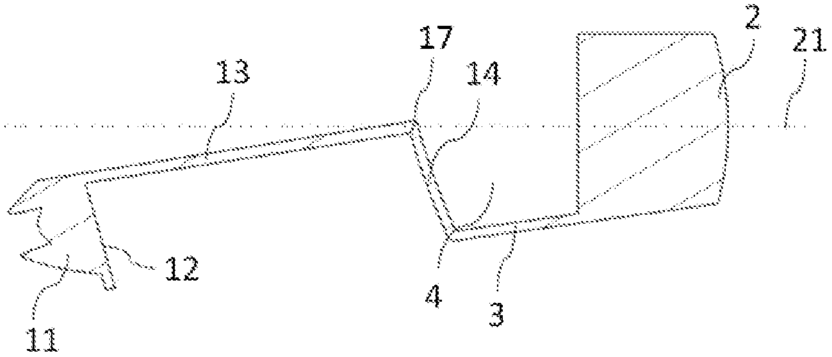
FIG. 11 is a section view of the vehicle lamp module in FIG. 8.
Figure 12:
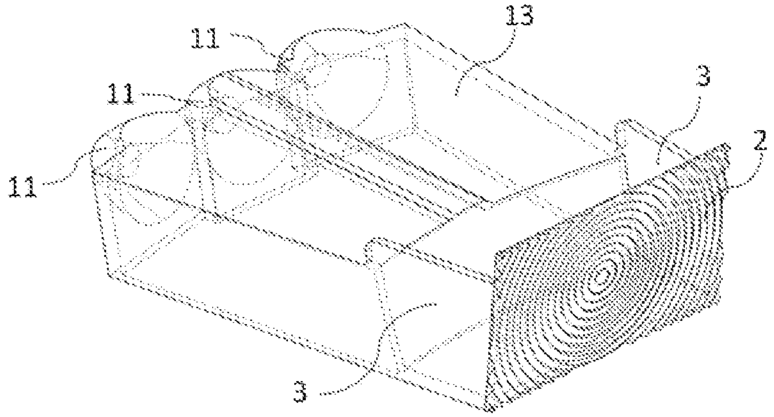
FIG. 12 is a three-dimensional structure diagram of a third specific embodiment of the vehicle lamp module including the headlamp optical element in FIG. 1.
Figure 13:
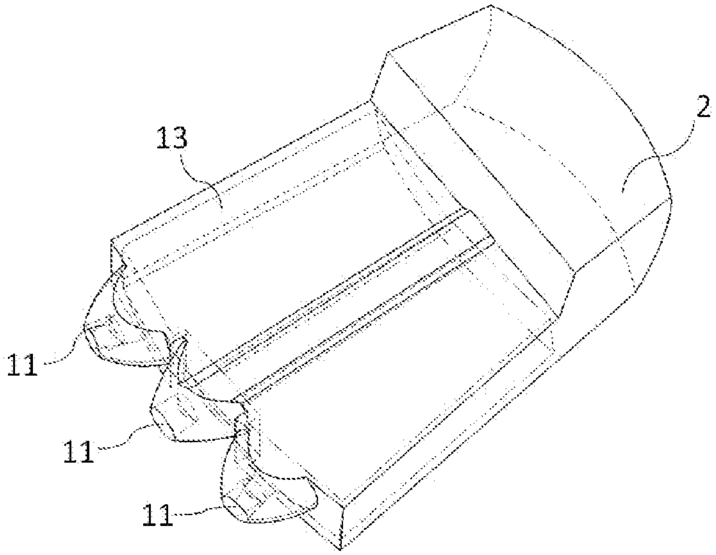
FIG. 13 is a first three-dimensional structure diagram of a fourth specific embodiment of the vehicle lamp module including the headlamp optical element in FIG. 1.
Figure 14:
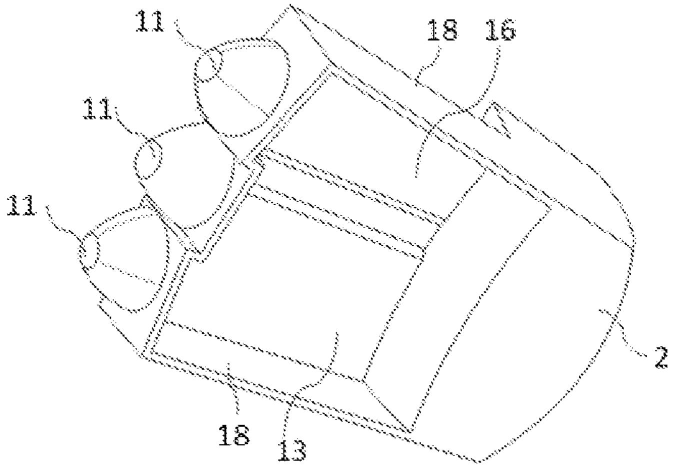
FIG. 14 is a second three-dimensional structure diagram of the fourth specific embodiment of the vehicle lamp module including the headlamp optical element in FIG. 1.
Figure 15:
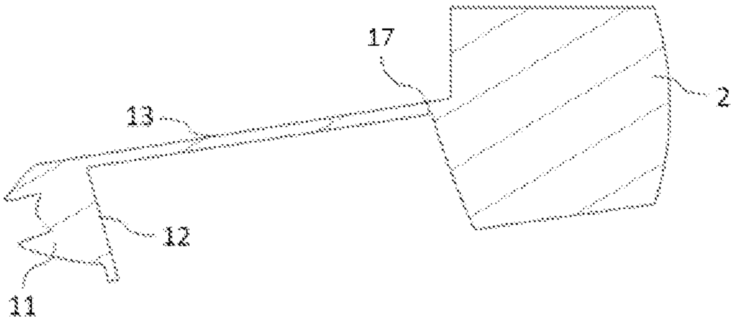
FIG. 15 is a section view of the vehicle lamp module in FIG. 13.
Figure 17:
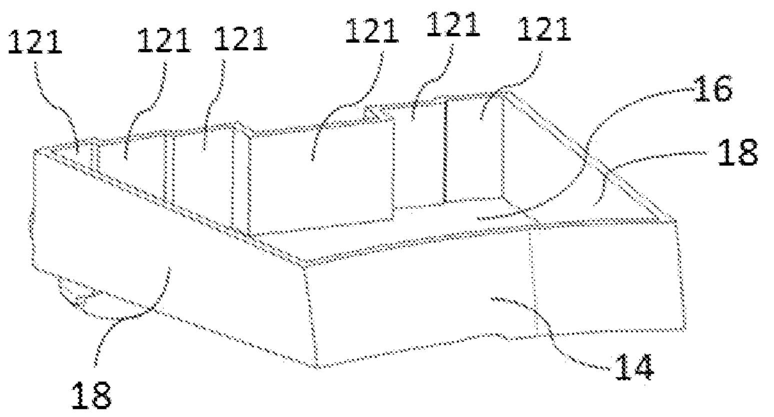
FIG. 17 is a second three-dimensional structure diagram of the second specific embodiment of the headlamp optical element.
Figure 18:
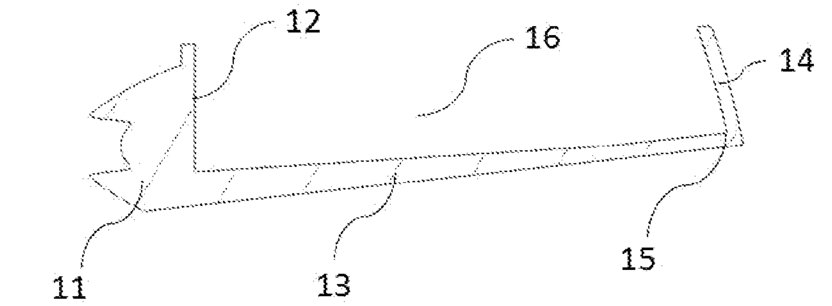
FIG. 18 is a section view of FIG. 16.
Figure 19:
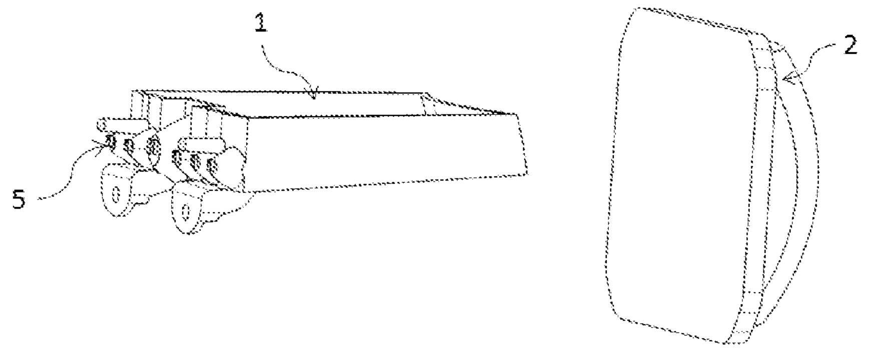
FIG. 19 is a three-dimensional structure diagram of the first specific embodiment of the vehicle lamp module including the headlamp optical element in FIG. 16.
Figure 20:
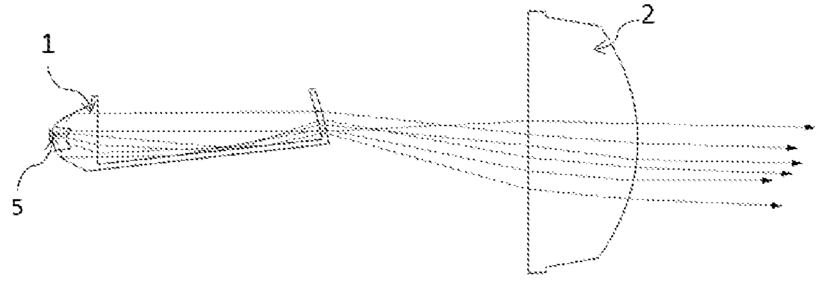
FIG. 20 is a light path schematic diagram of the vehicle lamp module including the headlamp optical element in FIG. 16.
Figure 21:
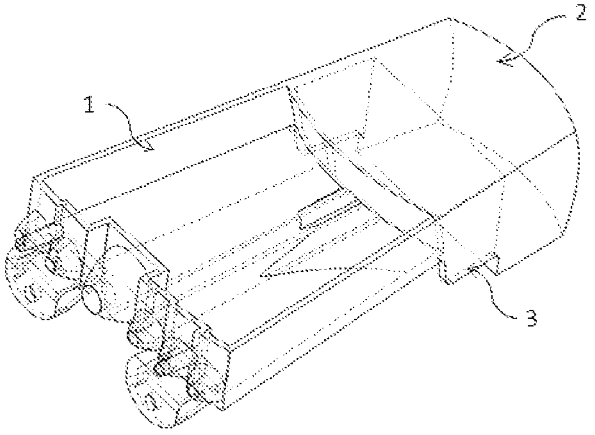
FIG. 21 is a first three-dimensional structure diagram of the second specific embodiment of the vehicle lamp module including the headlamp optical element in FIG. 16.
Figure 22:
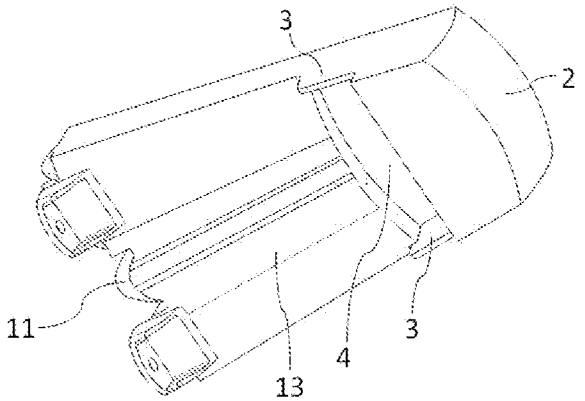
FIG. 22 is a second three-dimensional structure diagram of the second specific embodiment of the vehicle lamp module including the headlamp optical element in FIG. 16.
Figure 23:
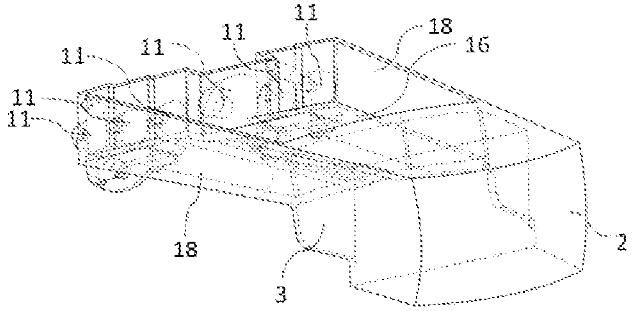
FIG. 23 is a third three-dimensional structure diagram of the second specific embodiment of the vehicle lamp module including the headlamp optical element in FIG. 16.
Figure 24:
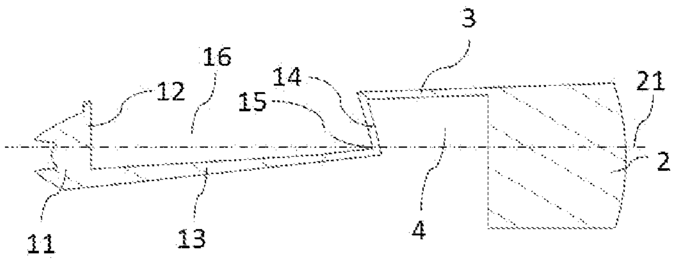
FIG. 24 is a section view of the vehicle lamp module in FIG. 21.
Figure 25:
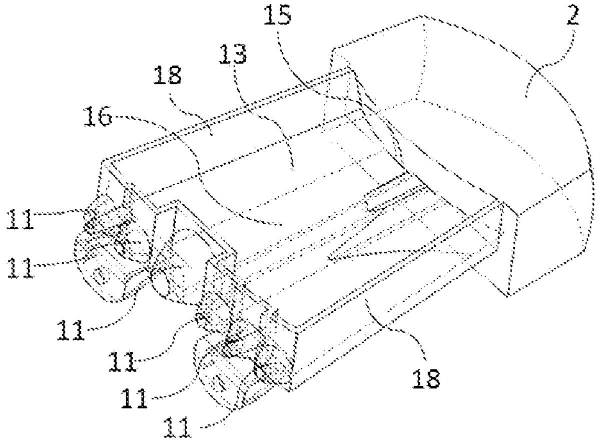
FIG. 25 a three-dimensional structure diagram of a third specific embodiment of the vehicle lamp module including the headlamp optical element in FIG. 16.
Figure 26:
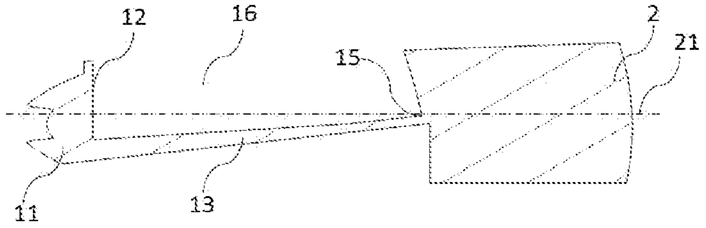
FIG. 26 is a section view of the vehicle lamp module in FIG. 25.

As shown in FIG. 2 and FIG. 17, the rear end of the headlamp optical element 1 is provided with a plurality of light collecting portions 11, each light collecting portion 11 is correspondingly provided with the first light emitting portion 12, and each first light emitting portion 12 forms a step surface 121. Each stepped surface 121 can have various structural forms, firstly, a single stepped surface 121 can be a plane or a smooth curved surface with continuous curvature; secondly, the area of each step surface 121 is in direct proportion to the size of the corresponding light collecting portion 11, that is, the larger the connecting surface of the light collecting portion 11 and the first light emitting portion 12 is, the larger the area of the step surface 121 is, and otherwise, the smaller the area of the step surface 121 is; finally, in order to meet the requirement of light emission, the area of the step surface 121 of the middle region is larger than those of the step surfaces 121 of the regions on the two sides. In addition, the step surfaces 121 on the two sides can be arranged to be symmetrical relative to the two sides of the step surface 121 in the middle region. The main purpose that the step surfaces 121 are independently arranged is to adjust the light shape by adjusting the step surfaces 121, operation is convenient, and the dimming effect is good.

Figure 30:
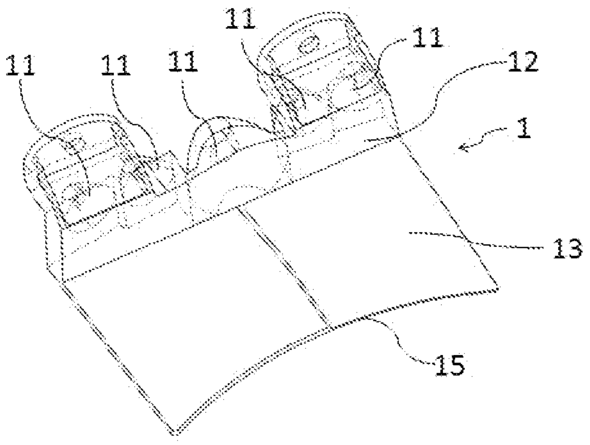
FIG. 30 is a three-dimensional structure diagram of a fourth specific embodiment of the headlamp optical element.
Figure 31:
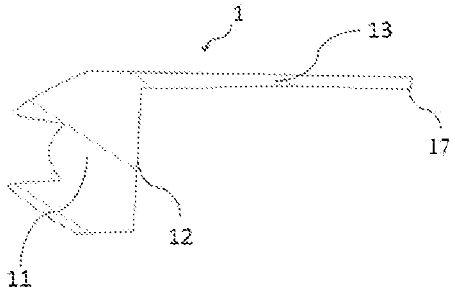
FIG. 31 is a section view of a fifth specific embodiment of the headlamp optical element.
Figure 32:
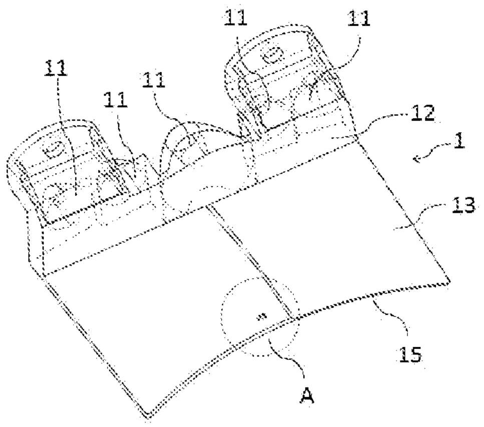
FIG. 32 is a first three-dimensional structure diagram of a sixth specific embodiment of the headlamp optical element.

As shown in FIG. 30 and FIG. 32, the first light emitting portion 12 can also be a continuous and smooth curved surface or a plane according to the light emitting requirement, and at the moment, the first light emitting portion 12 is an independent surface.

As another preferable implementation mode, the light-emitting surface of the second light-emitting portion 14 is a smooth inner concave curved surface with continuous curvature. The inner concave curved surface can enable the emergent light to be clearer in shape, and certainly, the second light emitting portion 14 is not limited to the structure of the inner concave curved surface and can also be a plane or other free-form surface structures.

Figure 27:
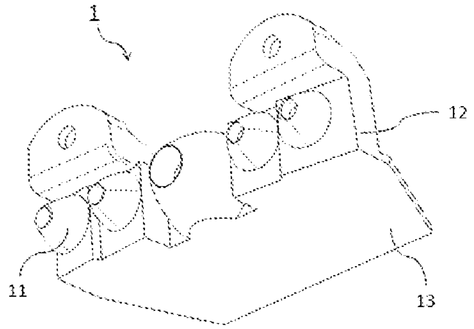
FIG. 27 is a first three-dimensional structure diagram of the third specific embodiment of the headlamp optical element.
Figure 28:
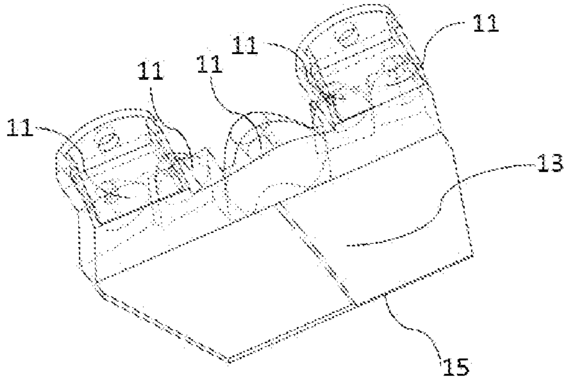
FIG. 28 is a second three-dimensional structure diagram of the third specific embodiment of the headlamp optical element.
Figure 29:
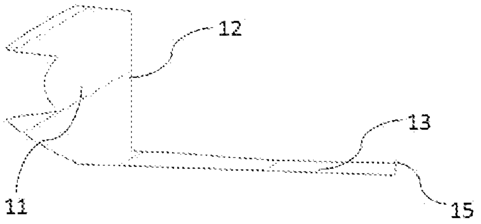
FIG. 29 is a section view of FIG. 27.

As another preferable implementation mode, the end surface of one end, far away from the light collecting portion 11, of the reflecting portion 13 is a smooth concave arc-shaped curved surface with continuous curvature, and the lower beam bright-dark cut-off line structure 15 or the high beam bright-dark cut-off line structure 17 is arranged on the lower edge or the upper edge of the concave arc-shaped curved surface, so that the concave arc-shaped curved surface enables the lower beam bright-dark cut-off line 61 or the high beam bright-dark cut-off line 62 of the light shape of the vehicle lamp to be clearer and sharper, and certainly, as shown in the FIG. 27 and the FIG. 28, the end surface of the end, away from the light collecting portion 11, of the reflecting portion 13 is a plane. The structural form of one end, far away from the light collecting portion 11, of the reflecting portion 13 can also be a free curved surface structure or other forms, and all the forms are determined according to the requirement of the light emitting effect.

Optionally, the headlamp optical element 1 further includes side walls 18, the side walls 18 are arranged on the left side and the right side of the reflecting portion 13, one end of each side wall 18 is connected with the first light emitting portion 12, and the other end of each side wall 18 is connected with the second light emitting portion 14.

As shown in FIG. 1 to FIG. 3, FIG. 16 and FIG. 17, the side walls 18 are arranged on the two sides of the headlamp optical element 1, one end of the side wall 18 is connected with the first light emitting portion 12, the other end of the side wall 18 is connected with the second light emitting portion 14, and the side walls 18 can enable the headlamp optical element 1 to be higher in strength and longer in service life. Alternatively, in order to meet the requirement of the appearance of the vehicle lamp or further simplify the structure of the headlamp optical element 1 so as to save materials and reduce cost, the headlamp optical element 1 can be not provided with the side walls 18.

Figure 33:
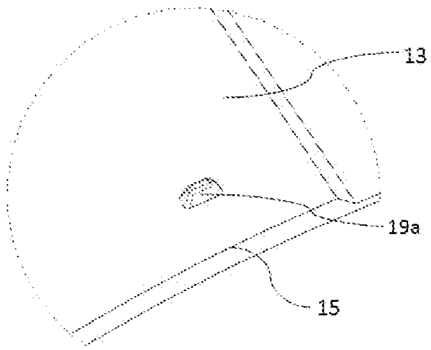
FIG. 33 is a local magnification schematic diagram of A in FIG. 32.

As shown in FIG. 32 and FIG. 33, as one specific implementation mode of the disclosure, a 50 L dark region forming structure 19*a* is formed on the reflecting surface of the reflecting portion 13 with the lower beam cut-off line structure 15, and the brightness of a lower beam 50 L region can be reduced after light is reflected and refracted by the 50 L dark region forming structure 19*a*.

The brightness of the 50 L region 64 in a lower beam shape is specifically limited, namely, 50 L is smaller than or equal to 15 lx, the 50 L dark region forming structure 19*a* is arranged on the reflecting surface, after light emitted to the 50 L dark region forming structure 19*a* from the first light emitting portion 12 is reflected and refracted by the 50 L dark region forming structure 19*a*, the propagation direction of the light is changed, the light is emitted to the region outside the 50 L region 64. The brightness of the lower beam 50 L region 64 is reduced so as to meet the requirements of laws and regulations.

Figure 34:
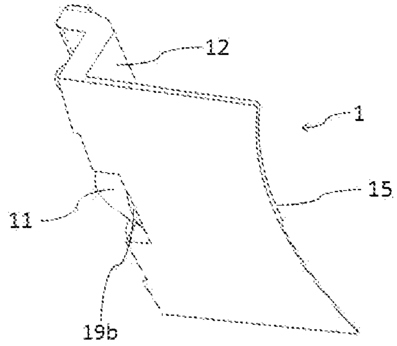
FIG. 34 is a second three-dimensional structure diagram of the sixth specific embodiment of the headlamp optical element.
Figure 35:
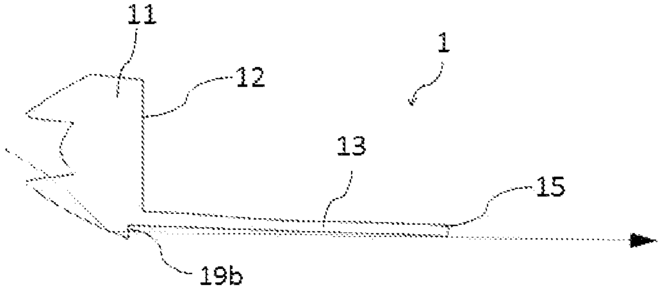
FIG. 35 is a light path schematic diagram of FIG. 34.
Figure 36:
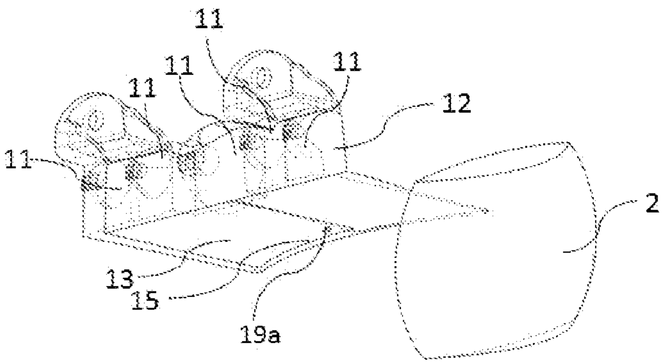
FIG. 36 is a three-dimensional structure diagram of the first specific embodiment of the vehicle lamp module including the headlamp optical element in FIG. 32.
Figure 37:
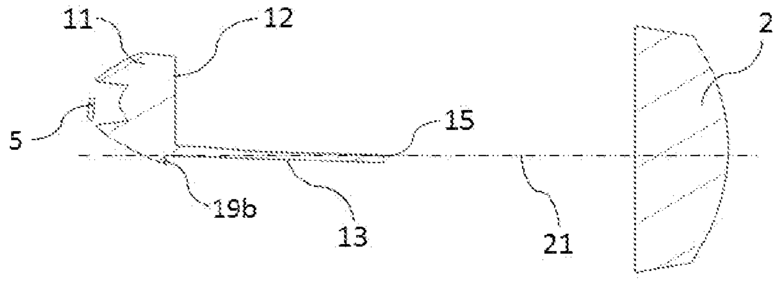
FIG. 37 is a section view of FIG. 36.
Figure 38:
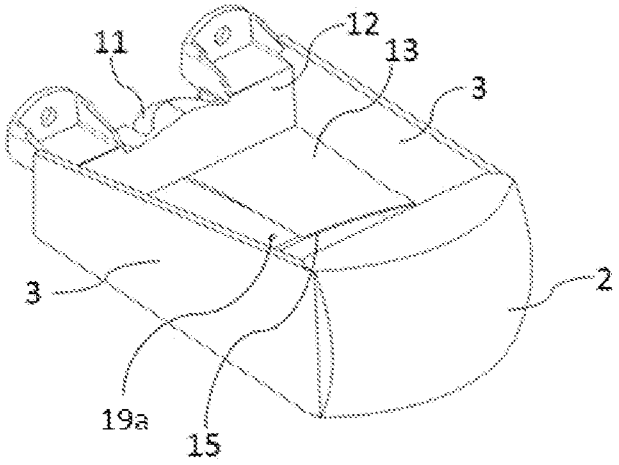
FIG. 38 is a first three-dimensional structure diagram of the second specific embodiment of the vehicle lamp module including the headlamp optical element in FIG. 32.
Figure 39:
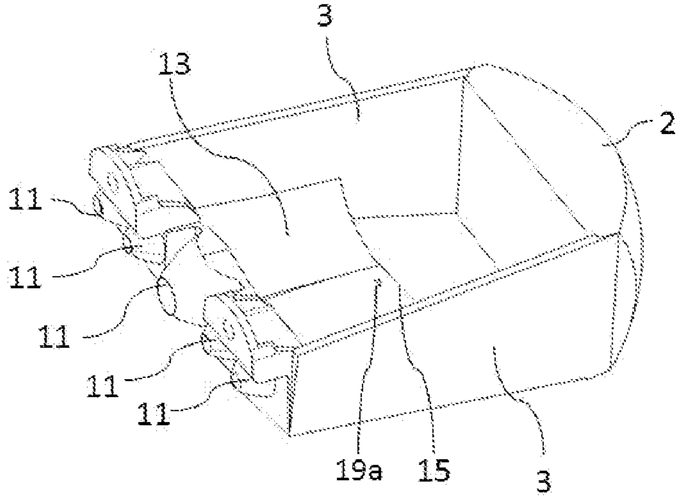
FIG. 39 is a second three-dimensional structure diagram of the second specific embodiment of the vehicle lamp module including the headlamp optical element in FIG. 32.
Figure 40:
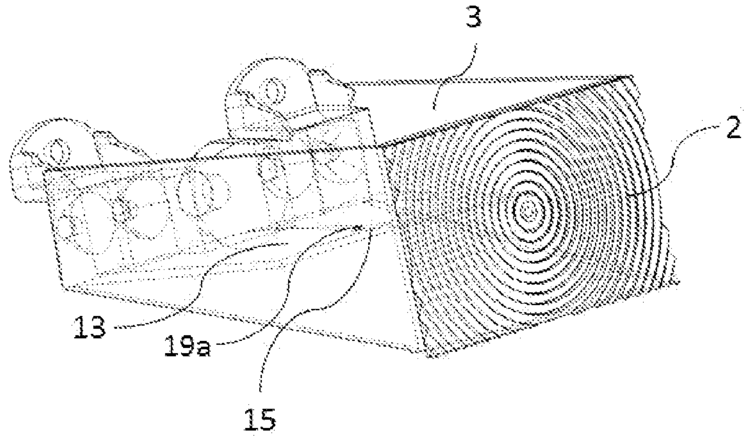
FIG. 40 is a three-dimensional structure diagram of the third specific embodiment of the vehicle lamp module including the headlamp optical element in FIG. 32.

As shown in FIG. 34 and FIG. 35, as another specific implementation mode of the disclosure, the lower beam cut-off line structure 15 is arranged on the front edge of the reflecting surface of the reflecting portion 13, the lower portion of the light collecting portion 11 is provided with a III-region light shape forming structure 19*b*, and the III-region light shape forming structure 19*b* can form a lower beam III-region light shape.

Figure 42:
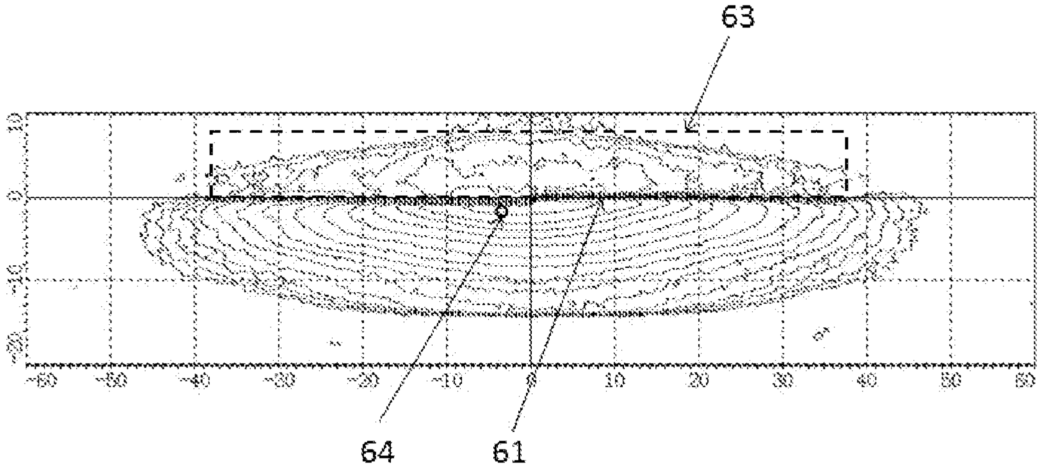
FIG. 42 is a simulation schematic diagram of a lower beam light shape formed by the vehicle lamp module of the headlamp optical element.

As shown in FIG. 34 and FIG. 35, the lower portion of the light collecting portion 11 is provided with the III-region light shape forming structure 19*b*, so that some of the light converged by the light collecting portion 11 can be emitted from the III-region light shape forming structure 19*b* and is emitted from the lower portion of the reflecting portion 13 to form a lower beam III-region 63 light shape shown in FIG. 42. In the prior art, the III region forming structure can be arranged on the lower surface of a lens, a lens bracket or the lower surface of a condenser and the like, some III region forming structures can influence the appearance of the lens, and some III region forming structures can influence the lighting effect. According to the headlamp optical element 1, the III-region light shape forming structure 19*b* is arranged on the lower portion of the light collecting portion 11, so that the light is emitted from the III-region light shape forming structure 19*b*, is emitted to the lens 2 after passing through the lower portion of the reflecting portion 13, and then is projected to the lower beam III region 63 through the lens 2, and therefore, the appearance of the lens is not influenced, and the lighting effect is not influenced.

Figure 41:
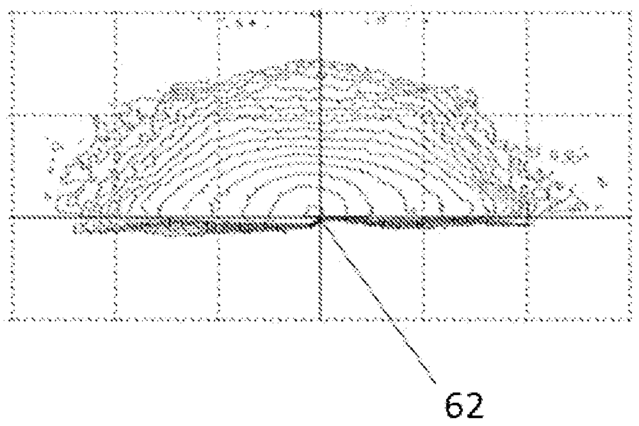
FIG. 41 is a simulation schematic diagram of a high beam light shape formed by the vehicle lamp module of the headlamp optical element.

Therefore, it can be seen that when the headlamp optical element 1 adopts a lower beam structure, the light source 5 is arranged at the opening of the concave cavity of the light collecting portion 11, and after the light is converged by the light collecting portion 11, some of the light directly enters the lens 2; some of the light is reflected by the reflecting surface of the reflecting portion 13 and then enters the lens 2; some of the light is emitted to the lens 2 after passing through the lower portion of the reflecting portion 13, after the above three parts of the light is projected through the lens 2, the lower beam light shape shown in the FIG. 42 can be formed, the propagation direction of the light emitted to the 50 L dark region forming structure 19*a* can be changed, and the brightness of the lower beam 50 L region 64 meets the regulation requirement. When the headlamp optical element 1 adopts a high beam structure, after the light emitted by the light source 5 is converged by the light collecting portion 11, some of the light is directly emitted into the lens 2, the rest of the light is reflected by the reflecting portion 13 and then is emitted into the lens 2, and after the above two parts of the light is projected by the lens 2, a high beam light shape with a high beam bright-dark cut-off line 62 as shown in a FIG. 41 is formed.

Specifically, the number of the light collecting portions 11 is two or above. The headlamp optical element 1 of the disclosure includes two light collecting portions 11 or above, each light collecting portion 11 is correspondingly provided with one light source 5, heat dissipation of the light sources 5 is facilitated after the multiple light sources 5 are arranged in a scattered mode, and meanwhile the optical efficiency of the headlamp optical element 1 can be improved by adopting the multiple light collecting portions 11. In general, according to the light emitting requirement, the light collecting portion 11 in the middle region is larger than the light collecting portions 11 in the regions on the two sides, and therefore the light shape with the high illumination requirement in the middle region can be obtained, more light can be converged, and the lighting effect is improved.

More specifically, a reflection increasing layer is arranged on the reflecting surface of the reflecting portion 13. The reflecting surface of the reflecting portion 13 is an optical surface used for receiving some of the light emitted by the first light emitting portion 12, the reflection increasing layer can be additionally arranged on the reflecting surface of the reflecting portion 13 so as to improve the reflectivity of the light, the reflection increasing layer can be a reflection increasing film or a reflection increasing coating arranged on the reflecting surface, and generally, the reflecting surface of the reflecting portion 13 is subjected to aluminum plating treatment.

As shown in FIG. 13 to FIG. 15, FIG. 25 and FIG. 26, the second aspect of the disclosure provides a vehicle lamp module which includes the headlamp optical element 1 according to any one of the technical solutions and the lens 2, the lens 2 is arranged along the light emitting direction of the headlamp optical element 1, and the headlamp optical element 1 is directly connected with the lens 2. In this way, the headlamp optical element 1 and the lens 2 are of an integrated structure, and under the integrated structure, the vehicle lamp module can be integrally formed in an injection molding mode through materials such as glass, PC, PMMA or silica gel.

Optionally, as shown in FIG. 8 to FIG. 12, FIG. 21 to FIG. 24 and FIG. 38 to FIG. 40, the vehicle lamp module further includes a connecting plate 3, the headlamp optical element 1 and the lens 2 are connected by the connecting plate 3, and the headlamp optical element 1, the lens 2 and the connecting plate 3 can be integrally formed in an injection molding mode.

The vehicle lamp modules of the two above structural forms are integrally formed in an injection molding mode, the number of parts can be reduced, the assembled vehicle lamp structure is more compact, meanwhile, the assembling error between the optical elements in the assembling process can be avoided, the assembling precision is improved, the optical precision can be improved, and the size of the vehicle lamp module can be reduced. Therefore, production efficiency is improved and production cost is reduced.

It needs to be explained that when the vehicle lamp module is of the integrated structure, only one optical element formed by integrated injection molding of the headlamp optical element 1 and the lens 2 is needed, the illumination light shape can be achieved, other optical elements do not need to be arranged, and the structure is simple. Certainly, in order to meet the requirements of vehicle lamp modeling and the like, at least one inner lens can be arranged between the optical element and the outer lens which are integrally formed through injection molding, and the inner lens can be a common plastic part with the equal wall thickness, only presents the required modeling, and can also be a light distribution plastic part with the back surface having a light distribution function.

Certainly, as shown in FIG. 5 to FIG. 7, FIG. 19, FIG. 20, FIG. 36 and FIG. 37, the lens 2 can also be directly arranged at the front end of the headlamp optical element 1 without the connecting plate 3, and other mounting brackets are respectively used to install the headlamp optical element 1 and the lens 2 on a radiator in a lamp body. At the moment, the headlamp optical element 1 and the lens 2 are of a split type structure, the lens 2 is arranged along the light emitting direction of the headlamp optical element 1, the headlamp optical element 1 and the lens 2 are arranged in a separated mode, light distribution parameters are multiple, light distribution is facilitated, the headlamp optical element 1 and the lens 2 can be flexibly arranged according to the modeling requirement of the vehicle lamp, the modeling of the vehicle lamp is more novel and variable, and the requirements of a user on personalized and scientific vehicle lamp modeling are met.

Specifically, the lower beam cut-off line structure 15 or the high beam cut-off line structure 17 is located in a region 10 mm above an optical axis 21 of the lens 2 and 10 mm below the optical axis 21 of the lens 2.

In order to form a clear light shape, the relative positions of the reflecting portion 13 and the lens 2 need to be adjusted, so that the lower beam bright-dark cut-off line structure 15 or the high beam bright-dark cut-off line structure 17 is located in a region 10 mm above and 10 mm below the optical axis 21 of the lens 2, and preferably, the lower beam bright-dark cut-off line structure 15 or the high beam bright-dark cut-off line structure 17 is located in a region 2 mm above and 2 mm below the optical axis 21 of the lens 2, and more preferably, the lower beam bright-dark cut-off line structure 15 or the high beam bright-dark cut-off line structure 17 is located at the optical axis 21 of the lens 2, that is, the focal point of the lens 2 is located on the lower beam bright-dark cut-off line structure 15 or the high beam bright-dark cut-off line structure 17, and the formed light shape is clearer.

More specifically, the lens 2 is of a convex lens or Fresnel lens structure, diversification of the vehicle lamp module can be achieved through the lenses 2 of different structural forms, and meanwhile when the lens 2 is of the Fresnel lens structure, the size of the vehicle lamp module can be smaller and the weight can be lighter.

The third aspect of the disclosure provides a vehicle lamp which includes the vehicle lamp module according to any one of the technical solutions.

The fourth aspect of the disclosure further provides a vehicle which includes the vehicle lamp in the technical solutions.

Figure 16:
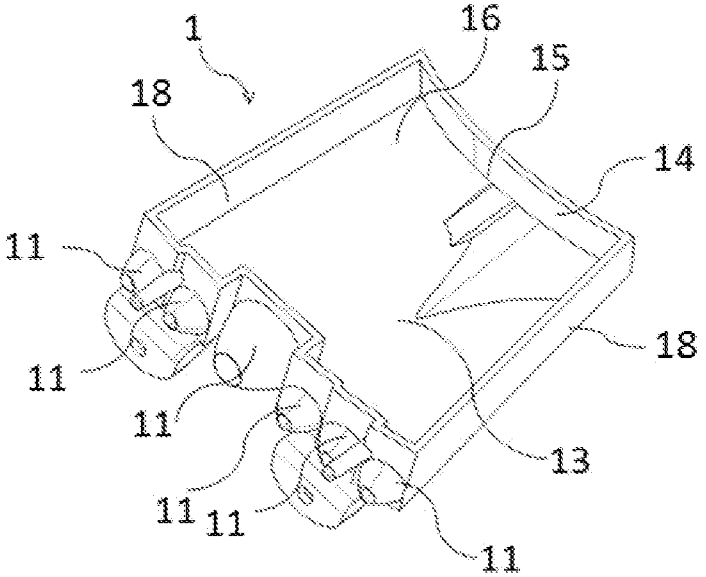
FIG. 16 is a first three-dimensional structure diagram of a second specific embodiment of the headlamp optical element.

The beneficial effects of the disclosure are as follows: firstly, the second light emitting portion 14 of the headlamp optical element 1 of the vehicle and the lens 2 are integrally formed, the reflecting portion 13 is arranged on the upper portion of the first light emitting portion 12, the light source 5 is arranged at the opening of the concave cavity of the light collecting portion 11, and after the light is converged through the light collecting portion 11, some of the light directly penetrates through the first cavity 16 to enter the lens 2; the rest of the light is reflected on the reflecting surface of the reflecting portion 13 and then directly enters the lens 2, and after the above two parts of the light is overlapped, a high beam light shape with a high beam bright-dark cut-off line 62 is formed, and the specific light shape is shown in FIG. 16. The vehicle lamp module is of an integrated structure, the number of parts can be reduced, the assembled vehicle lamp structure is more compact, meanwhile, assembly errors among all optical elements in the assembly process can be avoided, the assembly precision is improved, the optical precision can be improved, the size of the high beam lamp module can be reduced, and production efficiency is improved and production cost is reduced. It needs to be explained that the vehicle lamp module is a high beam lamp module, an integrated structure is adopted, the high beam light shape can be achieved only through an optical element integrally formed by the headlamp optical element 1 and the lens 2, other optical elements do not need to be arranged, and the structure is simple.

Secondly, the second light emitting portion 14 of the headlamp optical element 1 and the lens 2 are integrally formed, the reflecting portion 13 is arranged on the lower portion of the first light emitting portion 12, the light source 5 is arranged at the opening of the concave cavity of the light collecting portion 11, after light is converged through the light collecting portion 11, some of the light directly penetrates through the first cavity 16 to enter the lens 2, and the rest of the light directly enters the lens 2 after being reflected by the reflecting surface of the reflecting portion 13. After the above two parts of the light is overlapped, the lower beam lamp module can form a lower beam light shape which is shown in FIG. 42 and located below the lower beam bright-dark cut-off line 61. The vehicle lamp module is a lower beam lamp module, an integrated structure is adopted, the number of parts can be reduced, the structure of the assembled vehicle lamp is more compact, meanwhile, assembly errors among all optical elements in the assembly process can be avoided, the assembly precision is improved, the optical precision can be improved, the size of the lower beam lamp module can be reduced, therefore, production efficiency is improved and production cost is reduced. It needs to be explained that when the lower beam lamp module is of the integrated structure, the lower beam light shape can be achieved only through an optical element integrally formed by the headlamp optical element 1 and the lens 2, other optical elements do not need to be arranged, and the structure is simple.

Certainly, for both the lower beam lamp module and the high beam lamp module, at least one inner lens can be arranged between the optical element and the outer lens which are integrally formed in order to meet the requirements of vehicle lamp modeling and the like, and the inner lens can be a common plastic part with the equal wall thickness, only presents the required modeling, and can also be a light distribution plastic part with the back surface having a light distribution function.

According to the description, the headlamp optical element 1 of the disclosure includes the light collecting portions 11, the first light emitting portion 12 and the reflecting portion 13 which are sequentially and integrally connected along the light emitting direction; or the headlamp optical element 1 includes the light collecting portions 11, the first light emitting portion 12, the reflecting portion 13 and the second light emitting portion 14 which are sequentially and integrally connected along the light emitting direction, the first light emitting portions 12, the reflecting portion 13 and the second light emitting portion 14 define the first cavity 16, and the light collecting portion 11 can converge incident light and enable the light to be emitted out through the first light emitting portion 12; some of the light can penetrate through the first cavity 16 and is directly emitted to the second light emitting portion 14, and the rest of the light can be reflected by the reflecting portion 13 and then is emitted to the second light emitting portion 14. One end of the reflecting portion 13 is connected with the lower portion of the first light emitting portion 12, and the other end of the reflecting portion 13 is provided with a lower beam cut-off line structure 15 used for forming a lower beam bright-dark cut-off line 61; or one end of the reflecting portion 13 is connected with the upper portion of the first light emitting portion 12, and the other end of the reflecting portion 13 is provided with a high beam cut-off line structure 17 for forming a high beam bright-dark cut-off line 62; and the light-emitting surface of the first light-emitting portion 12 is formed of multiple step surfaces 121 with segment differences or is a single smooth curved surface with continuous curvature. The occupied space of the headlamp optical element 1 is small, the space utilization rate is greatly improved, the requirements of the market for diversification and miniaturization of the vehicle lamp can be met, and the structure of the vehicle lamp is simplified on the basis that the position precision between optical surfaces on a light propagation path is improved, so that the vehicle lamp is lighter.

The preferable implementation modes of the disclosure are described in detail in combination with the attached drawings, however, the disclosure is not limited to the specific details in the implementation modes, in the technical concept range of the disclosure, the technical solutions of the disclosure can be subjected to various simple variations, and the simple variations all belong to the protection range of the disclosure.

In addition, it needs to be explained that all the specific technical characteristics described in the specific implementation modes can be combined in any appropriate mode without conflicts, and in order to avoid unnecessary repetition, all possible combination modes are not explained any more.

In addition, various different implementation modes of the disclosure can also be combined at will, and as long as the implementation modes do not violate the idea of the disclosure, the implementation modes also should be regarded as the content disclosed by the disclosure.

The invention claimed is:

1. A headlamp optical element, comprising a light collecting portion, a first light emitting portion and a reflecting portion which are sequentially and integrally connected along the light emitting direction and the light collecting portion is able to converge incident light and emit the light via the first light emitting portion, wherein the rear end of the reflecting portion is connected with the lower portion of the first light emitting portion, and the front end of the reflecting portion is provided with a lower beam cut-off line structure used for forming a lower beam bright-dark cut-off line;

a light-emitting surface of the first light-emitting portion is formed of multiple step surfaces with segment differences; and the lower portion of the light collecting portion is provided with a III-region light shape forming structure, and the III-region light shape forming structure is able to form a lower beam III-region light shape.

2. A vehicle lamp module, comprising the headlamp optical element according to claim 1 and a lens, the lens being arranged along the light emitting direction of the headlamp optical element, wherein the headlamp optical element is directly connected with the lens; or further comprising a connecting plate, the headlamp optical element is connected with the lens through the connecting plate, and the headlamp optical element, the lens and the connecting plate are integrally formed in an injection molding mode.

3. The vehicle lamp module according to claim 2, wherein the lower beam cut-off line structure is located in a region 10 mm above an optical axis of the lens and 10 mm below the optical axis of the lens.

4. The vehicle lamp module according to claim 3, wherein the lens is of a convex lens structure or a Fresnel lens structure.

5. A vehicle lamp, comprising the vehicle lamp module according to claim 2.

6. The vehicle lamp according to claim 5, further comprising a second light emitting portion, wherein the first light emitting portion, the reflecting portion and the second light emitting portion define a first cavity, and the light collecting portion is able to converge incident light and emit the light via the first light emitting portion, with some of the light being able to be directly emitted to the second light emitting portion after passing through the first cavity, and some of the remaining light being able to be reflected by the reflecting portion and then emitted to the second light emitting portion.

7. The vehicle lamp according to claim 6, wherein the lower beam cut-off line structure is located in a region 10 mm above an optical axis of the lens and 10 mm below the optical axis of the lens.

8. The vehicle lamp according to claim 6, wherein the step surface is a plane or a smooth curved surface with continuous curvature, and the area of the step surface in the middle region is larger than those of the step surfaces on the two sides.

9. The vehicle lamp according to claim 6, further comprising side walls, wherein the side walls are arranged on the left side and the right side of the reflecting portion, one end of each side wall is connected with the first light emitting portion, and the other end of each side wall is connected with the second light emitting portion.

10. The vehicle lamp according to claim 6, wherein a 50 L dark region forming structure is formed on a reflecting surface of the reflecting portion with the lower beam cut-off line structure, and the brightness of a lower beam 50 L region is able to be reduced after light is reflected and refracted by the 50 L dark region forming structure.

11. The vehicle lamp module according to claim 2, further comprising a second light emitting portion, wherein the first light emitting portion, the reflecting portion and the second light emitting portion define a first cavity, and the light collecting portion is able to converge incident light and emit the light via the first light emitting portion, with some of the light being able to be directly emitted to the second light emitting portion after passing through the first cavity, and some of the remaining light being able to be reflected by the reflecting portion and then emitted to the second light emitting portion.

12. The vehicle lamp module according to claim 11, wherein the light collecting portions are of a light converging cup structure and are arranged in one-to-one correspondence with the step surfaces.

13. The vehicle lamp module according to claim 12, wherein the step surface is a plane or a smooth curved surface with continuous curvature, and the area of the step surface in the middle region is larger than those of the step surfaces on the two sides.

14. The vehicle lamp module according to claim 11, further comprising side walls, wherein the side walls are arranged on the left side and the right side of the reflecting portion, one end of each side wall is connected with the first light emitting portion, and the other end of each side wall is connected with the second light emitting portion.

15. The vehicle lamp module according to claim 11, wherein a 50 L dark region forming structure is formed on a reflecting surface of the reflecting portion with the lower beam cut-off line structure, and the brightness of a lower beam 50 L region is able to be reduced after light is reflected and refracted by the 50 L dark region forming structure.

16. The headlamp optical element according to claim 1, further comprising a second light emitting portion, wherein the first light emitting portion, the reflecting portion and the second light emitting portion define a first cavity, and the light collecting portion is able to converge incident light and emit the light via the first light emitting portion, with some of the light being able to be directly emitted to the second light emitting portion after passing through the first cavity, and some of the remaining light being able to be reflected by the reflecting portion and then emitted to the second light emitting portion.

17. The headlamp optical element according to claim 16, wherein the light collecting portions are of a light converging cup structure and are arranged in one-to-one correspondence with the step surfaces.

18. The headlamp optical element according to claim 17, wherein the step surface is a plane or a smooth curved surface with continuous curvature, and the area of the step surface in the middle region is larger than those of the step surfaces on the two sides.

19. The headlamp optical element according to claim 16, wherein a light-emitting surface of the second light-emitting portion is a smooth concave curved surface with continuous curvature.

20. The headlamp optical element according to claim 16, wherein the reflecting portion far away from an end surface of the light collecting portion is a smooth concave arc-shaped curved surface with continuous curvature.

21. The headlamp optical element according to claim 16, further comprising side walls, wherein the side walls are arranged on the left side and the right side of the reflecting portion, one end of each side wall is connected with the first light emitting portion, and the other end of each side wall is connected with the second light emitting portion.

22. The headlamp optical element according to claim 16, wherein a 50 L dark region forming structure is formed on a reflecting surface of the reflecting portion with the lower beam cut-off line structure, and the brightness of a lower beam 50 L region is able to be reduced after light is reflected and refracted by the 50 L dark region forming structure.

* * * * *